US009171435B2

(12) United States Patent
Bairaktaris

(10) Patent No.: US 9,171,435 B2
(45) Date of Patent: Oct. 27, 2015

(54) SYSTEM AND METHOD FOR LIGHT-BASED IDENTIFICATION

(71) Applicant: Dimitra Denise Bairaktaris, Somerset, NJ (US)

(72) Inventor: Dimitra Denise Bairaktaris, Somerset, NJ (US)

( * ) Notice: Subject to any disclaimer, the term of this patent is extended or adjusted under 35 U.S.C. 154(b) by 492 days.

(21) Appl. No.: 13/660,319

(22) Filed: Oct. 25, 2012

(65) Prior Publication Data

US 2015/0179028 A1 Jun. 25, 2015

(51) Int. Cl.
*G08B 5/36* (2006.01)
*H04B 10/116* (2013.01)
*G08B 7/06* (2006.01)

(52) U.S. Cl.
CPC .. *G08B 5/36* (2013.01); *G08B 7/064* (2013.01)

(58) Field of Classification Search
CPC ...... G07C 9/00158; G08B 7/064; G08B 5/36; G08B 5/38; G08B 13/19647; B60Q 1/2611; B60Q 7/00; B60R 2001/1215; G08C 17/02; F21S 9/022; F21V 23/0471; H04B 10/116
USPC .............. 340/815.4, 815.45, 468, 471, 691.1, 340/691.8; 315/307, 308; 398/118, 172
See application file for complete search history.

(56) References Cited

U.S. PATENT DOCUMENTS 4,903,243 A 2/1990 Turner, Jr.
7,321,301 B2 1/2008 Spoltore
7,455,139 B2 * 11/2008 Lee ................................ 180/167
7,830,305 B2 11/2010 Boling et al.
7,992,773 B1 8/2011 Rothschild
8,188,878 B2 5/2012 Pederson et al.
8,716,953 B2 * 5/2014 Kreiner et al. ................ 315/307
2008/0051154 A1 2/2008 Schlomann et al.
2008/0088423 A1 4/2008 Liu
2008/0175355 A1 * 7/2008 DeBaugh ........................ 379/45
2008/0183337 A1 7/2008 Szabados
2009/0059603 A1 3/2009 Recker
2010/0090613 A1 4/2010 Spartano
2012/0078393 A1 3/2012 Kotb
2012/0130563 A1 5/2012 McBain
2013/0154821 A1 * 6/2013 Miller et al. .................. 340/471
2014/0347179 A1 * 11/2014 Fleszewski et al. ........... 340/468

OTHER PUBLICATIONS

International Search Report corresponding to PCT/US13/66352 dated Jul. 25, 2014.

* cited by examiner

*Primary Examiner* — Hung T Nguyen
(74) *Attorney, Agent, or Firm* — Dentons US LLP

(57) ABSTRACT

A visual identification system and device for providing a light based identification alert. The device comprises a housing and a light source disposed within the housing for producing the light based identification alert. The device further includes a processor configured to control activation of the light source in response to receiving a light source control request from a remote source. The processor is further configured to receive an override command for overriding the light source control request so as to prevent the remote source from controlling the light source. In various embodiments, the light source includes one or more activation modes, including a visible light mode and an invisible light mode.

45 Claims, 6 Drawing Sheets

SYSTEM AND METHOD FOR LIGHT-BASED IDENTIFICATION

FIELD OF THE INVENTION

The present invention relates generally to lighting systems and more particularly to light-based identification.

BACKGROUND

Generally, there are a number of situations in which visual identification of a person, vehicle or other entity may be important to maintain safety. For instance, emergency response vehicles rely on visual identification via light emitting devices, such as light bars, to ensure a safe right-of-way passage to their destination. Additionally, visual identification of persons as emergency responders, victims, or military operations personnel is often desired in various civilian emergency response and military operational contexts.

However, due to the very nature of both civilian emergency response and military operation environments, it may be difficult to locate and visually identify a person or entity that requires assistance. Typically, a person requiring assistance communicates information via a communication device, such as a mobile phone or a radio, to a responder. However, such communication devices do not provide visibility and visual identification of the person to response personnel, especially in the dark.

Furthermore, due to various unforeseen circumstances, military and paramilitary personnel, including undercover non-uniformed police, may find themselves under friendly fire, and therefore also need a way to visually identify their presence and association to other response units and bystanders. However, existing remotely operated light sources fail to provide the subject meant to be illuminated with control over the specifics of the illumination process, which precludes their use in covert operations and jeopardizes military and paramilitary personnel safety.

SUMMARY

The systems and methods described herein address the deficiencies of conventional systems by providing a visual identification system and a light source transceiver device for creating a light based identification alert. The light source transceiver device may be controlled locally or remotely. In one embodiment, the device comprises a housing and a light source disposed within the housing for producing the light based identification alert. The device further includes a processor configured to control activation of the light source in response to receiving a light source control request. The processor is further configured to receive an override command for overriding the light source control request so as to prevent a remote source from controlling the light source. In various embodiments, the light source includes one or more activation modes, including a visible light mode and an invisible light mode. The system further includes various priority schemes among light source control requests and override commands from different sources. In addition, the systems and methods are provided such that the light source transceiver system is configured to transmit and receive relevant data, including user location and biometric data. Additional embodiments implement a biometric authentication scheme, including encoding of biometric authentication data.

In another embodiment, a method for generating a light based identification alert is provided. The method comprises receiving a light source control request from a remote source for controlling activation of a light source, receiving an override command, and overriding the light source control request in response to the override command so as to prevent the remote source from controlling the light source.

In a further embodiment, a visual identification device for generating a light based identification alert is provided. The device comprising a housing, a multi-mode light source, disposed within the housing, for producing the light based identification alert. The device further includes a processor configured to activate the multi-mode light source in response to receiving a light source control request, wherein the light source control request comprises a request to activate the multi-mode light source in accordance with at least one of a plurality of light mode settings. The light mode settings include a visible light setting and an invisible light setting.

In yet another embodiment, a method for generating a light based identification alert is provided. The method comprises receiving a light source control request, the light source control request comprising a request to activate a multi-mode light source in accordance with at least one of a plurality of light mode settings, the light mode settings comprising a visible light setting and an invisible light setting. The method further includes activating the multi-mode light source in response to receiving the light source control request so as to generate the light based identification alert.

Additional features and advantages of embodiments will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Figure 1:
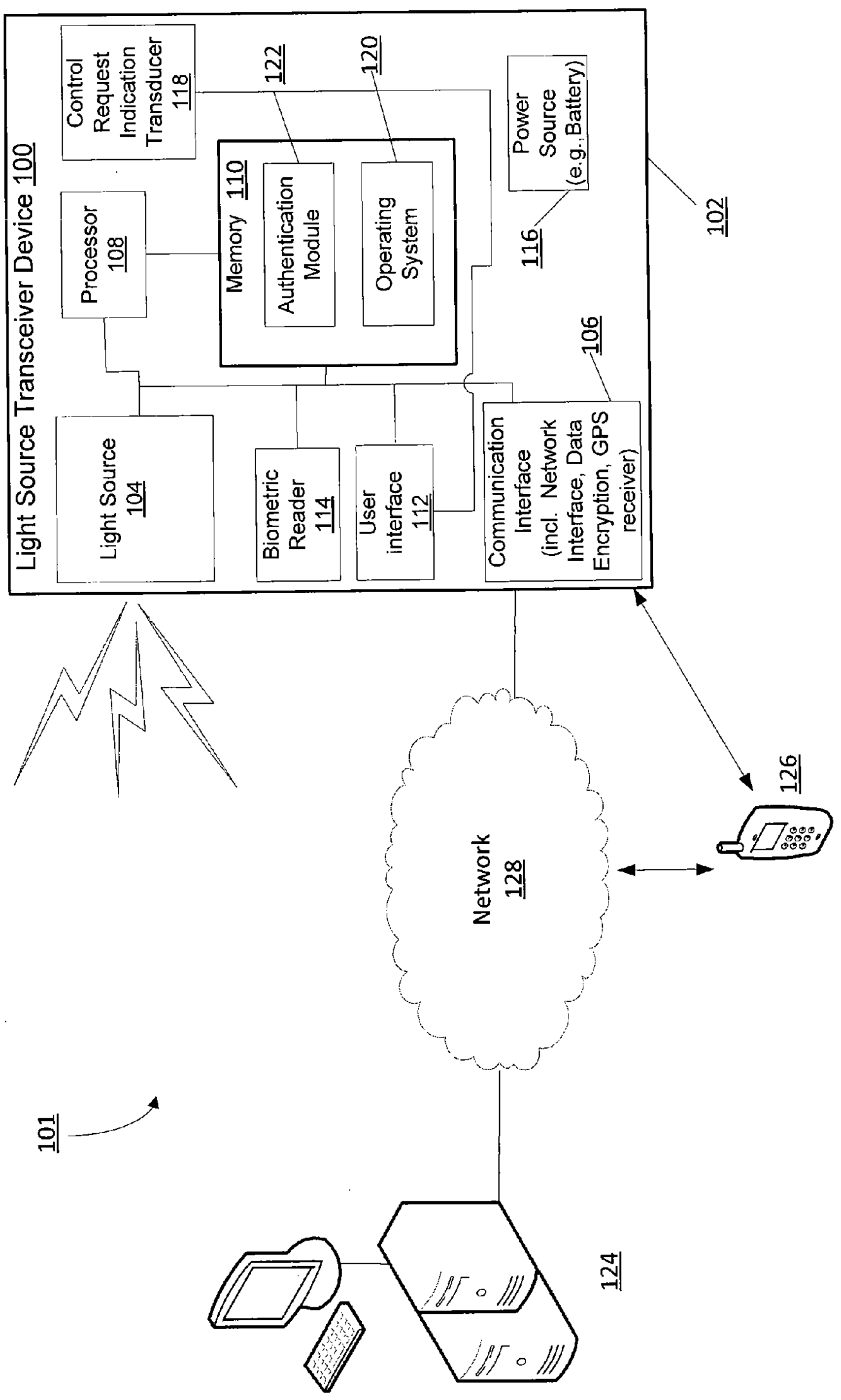
FIG. 1 is a schematic diagram illustrating a system environment of the light source transceiver device, in accordance with an embodiment of the present invention.

FIG. 1 is a schematic diagram illustrating an embodiment of a general system environment 101 of the light source transceiver device. The light source transceiver device 100 comprises a compact housing 102 configured to be attached to a person, animal, pet, vehicle, or a stationary object for providing light-based identification via illumination. In one embodiment, the housing 102 includes a light source 104 as well as a communication network interface 106, processor 108, non-transitory computer readable medium, such as computer memory 110, user interface 112, and authentication circuitry, such as a biometric reader 114. Alternatively, to provide increased miniaturization and/or placement flexibility, the light source 104 is externally connected to the housing 102, such as via a wired or short-range wireless connection, including a Bluetooth connection. In this case, the light source 104 may include its own power source, such as a battery, including without limitation a solar battery, or it may be inductively powered from the housing 102 via the power source 116.

In one embodiment, the user interface 112 further includes a control request indication transducer 118 for covertly indicating to the user that a light source control request has been received, as discussed in further detail below. The user interface 112 further comprises one or more of a touch screen, a liquid crystal display screen, and one or more buttons for local control, as well as additional status and messaging display via the light transceiver device 100. In the illustrated embodiment, the memory 110 further includes an operating system 120 for coordinating the operation of the processor 108 with the remaining components of the light source transceiver device 100. The memory 110 further includes an authentication module 122 including computer readable instructions and data for authenticating requests to control the light source 104 received from the user interface 112 via the biometric reader 114, as well as from remote sources.

As illustrated in FIG. 1, the light source transceiver device 100 is communicatively coupled to a command and control center 124 and/or mobile device 126 via a network 128. The command and control center 124, which may be a military control center, an emergency response center, including an Enhanced-911 (E-911) response center, as well as the mobile device 126, remotely control activation and deactivation of the light source transceiver device 100. The command and control center 124 and mobile device 126 communicate light source control request commands to the light source transceiver device 100 via the network 128. As discussed in further detail below, upon receipt of the light source control request command from the control center 124 or the mobile device 126, the light source transceiver device 100 determines whether a remote control override request has been activated to identify whether control over remote activation of the light source 104 should be allowed. In cases when covert operation is desired for team safety or mission success, the user of the light source transceiver device 100 activates a remote control override request to prevent remote activation of the light source 104.

The command and control center 124 and/or mobile device 126 may be configured to selectively communicate with a plurality of individually addressable light source transceivers. For instance, in a search-and-rescue or military operations scenario, the command and control center 124 may issue a light source control request to a selected group of light source transceiver devices, such as when the light source transceiver devices associated with a particular group or subgroup of military or rescue personnel is desired to be activated or deactivated.

In one embodiment, when the light source 104 is a multimode light source, the light source transceiver device 100 determines one or more light modes in which a light source 104 should be activated. In various embodiments, the light modes include a visible light mode, an invisible light mode (e.g., a light mode within a spectrum not visible to human or animal observers, such as an infra-red light emission mode), a plurality of selectable infrared light modes operating in various frequency ranges corresponding to the night vision devices being used in the field, a selection among multiple visible colors, a predetermined flash pattern mode, among others. In situations where semi-covert operation is desired an invisible light mode provides identification of the person, vehicle or other subject associated with the light source transceiver via special equipment such as infra-red vision equipment, while preserving covert status with respect to the observers not equipped with the necessary hardware. The invisible light mode may be employed when dealing with unsophisticated observers, such as in irregular warfare or during police operations.

In embodiments, the network 128 comprises a wireless wide area network (WWAN), including without limitation a satellite based or terrestrial based radio frequency (RF) network. Embodiments of a terrestrial based wireless network 128 include a network employing a cellular-based wireless access standard, such as CDMA 2000 1X, 1xEV-DO, 1xEV-DV, GSM, GPRS, EDGE, HSPDA, UMTS, LTE (3GPP Long Term Evolution), UMB (Ultra Mobile Broadband), as well as WiMAX-based network access technology. The network 128 may also at least partially include a troposcatter based microwave network. In further embodiments, the network 128 is a wireless local area network (WLAN) (e.g., Wi-Fi). The communication interface 106 includes a network transceiver circuitry corresponding to the type of access network 128. In an embodiment, the communication interface 106 further includes an encryption module for encrypting and decrypting the baseband signal communicated to and from the light source transceiver device 100. Additionally, the communication interface further comprises a Global Positioning System (GPS) receiver for determining the GPS coordinates of the transceiver 100.

Alternatively or in addition, the light source transceiver device 100 may be directly coupled to the mobile device 126, such as via a short range network. This arrangement may be employed by a military or paramilitary (e.g., police) unit leader to remotely control activation of one or more light source transceiver devices mounted to garments of team members dispersed throughout a house, a building, a city block, or throughout another short range perimeter. In this scenario, the unit leader may also activate a remote control override request for one or more team members so as to prevent remote activation of the team member light sources from the command and control center 124, thereby preserving the team's covert status and taking over the control functionality. In one embodiment, when multiple override requests have been received, the processor 108 of each light source transceiver 100 hierarchically processes such requests. For instance, for safety reasons, highest priority may be given to activation or deactivation of override requests generated by the wearer of the light source transceiver directly via the user interface 112 because the wearer is typically in the best position to assess the need to preserve covert status based on the local environment. The next highest priority may be given to override requests generated by a unit leader in short range communication with the wearer of the light source transceiver. Those of ordinary skill in the art will realize that different priority schemes based upon various situational contexts are likewise within the scope of the present description where such priority schemes may be based upon preserving member safety, covert status, operational security, or other mission critical considerations. In yet another embodiment, the remote control override requests are associated with a timer, where the timer expiration period depends upon the source of the override request. For instance, the timer duration for the remote control override request generated by the wearer of the light source transceiver may exceed the duration of the override request generated by the unit leader based on degree of local situation awareness as described above.

In one example, the mobile device 126 and light source transceiver device 100 are coupled via a personal area network, such as a Bluetooth network, a Wi-Fi ad hoc mode network, or the like. In another embodiment, the mobile device 126 connects to the light source transceiver device 100 via a Wi-Fi router or access point, which may in turn connect to a wide area network (WAN), such as the network 128.

In one embodiment, when a control request message to remotely activate the light source has been received while a remote control override request/command has been activated, the control request indication transducer 118 covertly provides the wearer of the light source transceiver with an indication that such request is pending. This discreetly prompts the wearer to deactivate the override command if appropriate in view of the local environment. In various embodiments, the transducer 118 may be integrated into the housing 102 or disposed external to the housing 102, such as via a wired or wireless connection. The transducer may be a low power light source facing only the wearer or otherwise integrated into the wearer's garment in such a way as to only be visible to the wearer (e.g., integrated into and/or interoperable with an interior portion of night vision goggles, glasses or sun glasses, as well as integrated into watches, mobile telephones, two-way radios, or other personal devices that may be kept in a pocket or other discreet location on a person). In further embodiments, the transducer may be a vibration transducer, such as a vibrating telephone battery or a vibrating watch. The transducer may also be a low-power audio source. Such audio source may be coupled to a low power piezoelectric driver or speaker within the housing 102, as well as to external headphones. Alternatively or in addition, the user is notified of the receipt of the remote control request via the screen or LED status light of the user interface 112.

In various examples, the light source transceiver device 100 is worn by personnel and integrated into garments such as personal clothing, uniforms, helmets, bullet-proof vests, safety vests, backpacks, protective gear, or the like. The light source transceiver device 100 may also be installed on objects, such as equipment, buildings, vehicles, airplanes, helicopters, ships, boats, or the like.

As described above, the light source transceiver device also provides the source, such as a person or an object, on which it is installed the ability to locally activate or deactivate the system. In one embodiment, light source transceiver device 100 contains an emergency feature which transmits the person's or object's GPS coordinates through the RF signal to the command and control center 124 and the mobile device 126.

As further illustrated in FIG. 1, the light source transceiver device 100 also includes a biometric reader 114 and an authentication module 122 (e.g., including instructions executed via the processor 108) which provide a biometric authentication feature, for instance in connection with local user/wearer control of the transceiver 100 and/or in connection with initiating a remote control override command via the transceiver 100. In particular, the light source transceiver device 100 transmits biometric information of the person desiring to locally control the transceiver 100 to the command and control center 124 and/or mobile device 126 for user authentication. Alternatively, the light source transceiver device 100 may perform local authentication of the biometric information scanned via the biometric reader 114 based on biometric data stored in the memory 110. In an embodiment, the light source transceiver 100 encodes the biometric information scanned via the biometric reader 114 with a particular code corresponding to the unique biometric information of the user. For instance, under an encoded system, biometric information is assigned in a database to a particular code, such as a unique hash value. The entity performing the authentication (e.g., command and control center 124, mobile device 126, and/or transceiver 100) includes memory having stored therein a database record corresponding to identical coding for approved users. When a person requesting control of the light source transceiver 100 uses their biometric makeup for authentication, a positive authentication occurs if the unique code value corresponding to the provided biometric information is identical to unique code value corresponding to the authentication information stored in the authentication database. In embodiments, issuance of control requests and override commands via the command and control center 124 and the mobile device 126 also implicate the biometric authentication process described above. In such scenarios, the authentication database may be a central database connected to the network 128 or a database stored within local memory.

As illustrative examples, the biometric reader 114 may include at least one of a fingerprint scanner and analyzer, a retina scanner and analyzer, a voiceprint processor and analyzer, or another similar biometric reading device. Alternatively or in addition, the authentication module 122 may require a security code, a pass phrase, and/or a personal identification number (PIN) for authentication. The authentication module 122 may also include a knowledge or rule-based verification system.

Various additional non-limiting examples of the system 101 illustrated in FIG. 1 are described below.

Military Application Examples:

Personnel Recover (PR): Combat Search and Rescue (CSAR)/Non-combatant Evacuation Operations (NEO)/ Contractor Personnel, as well as general search and rescue missions. Both CSAR and NEO are subsets of the core military mission that involves PR. The transceiver lighting system 101 can be used to authenticate personnel and equipment in both CSAR and NEO operations. In PR operations, especially during night operations, the transceiver lighting system 101 enables rescue teams to quickly identify equipment and personnel by causing them to be illuminated and by determining their GPS coordinates as described above in connection with FIG. 1. The light source transceiver device 100 can be installed on all military equipment, including but not be limited to weapons, weapon systems, motorized tracked and wheeled vehicles, aircraft, naval vessels, personnel garments, and personal protective equipment (PPE), such as Interceptor Body Armor (IBA) and Kevlar helmets.

Due to the terrain limitations and austere conditions in which the military operates, an embodiment of the transceiver lighting identification system 101 employs a satellite signal in any extra terrestrial frequency band but can also operate based upon any line of sight, short-range, or long-range terrestrial-based communication standard in order to provide combat commanders command and control (C2) flexibility and communication redundancy. The RF signal can be encrypted and/or non-encrypted and the light source transceiver device 100 can operate as a single band or a multi-band device. In embodiments, the light source 104 can be covert, visible by human eye, or overt where it can only be seen using night vision or infra-red vision devices.

Self-activated Lighting feature: There may be mission, enemy, terrain, troop, time (METT-T) dependent conditions wherein military personnel wearing the light source transceiver device 100 may require the ability to self-activate light source 104. In operational conditions where C2 is decentralized, a military person wearing the light source transceiver device 100 can activate the light source 104 through a built in self-activation feature such as a button or biometric enabled activation, as described above.

Self-activated Emergency feature: The light source transceiver device 100 enhances authentication and situational awareness by allowing the source wearing the equipment to self-activate, similar to the self-activated lighting feature, an emergency radio beacon which transmits through the RF signal and relates the source's location to the command post Common Operating Picture (COP) battlefield command systems, such as the Blue Force Tracker (BFT) feed, as well as to all the vehicular mounted BFTs in the surrounding area. This real-time emergency feature alerts all friendly forces that a friendly element is under distress and the elements precise location. This feature also immediately alerts the rescue team of the situation enabling prompt rescue mission planning. In an alternate embodiment, the location of the emergency radio beacon is communicated to the command and control center 124, including an emergency response command center, for locating the subject of a rescue. Alternatively or in addition, the emergency radio beacon is also remotely activated via the command and control center 124 and/or mobile device 126.

Identification Friend or Foe (IFF): The light source transceiver device 100 can be used overtly in the self-activation mode during operations where personnel may be under friendly fire attacks. A source who believes to be under attack by friendly forces can self-activate the transceiver 100 to positively identify themselves or their equipment as a friendly force.

Biometric Authentication: As described above, the light source transceiver device 100 is also equipped with a biometric authentication feature which enables the person/source attempting to control the transceiver 100 to authenticate themselves to the rescue team/command post through the transmission of biometric information including a corresponding unique code, as described above. This ensures positive real-time identification.

Beacon Broadcast: The light source transceiver device 100 may also transmit an intermittent beacon signal, which broadcasts the device's GPS location.

Paramilitary and Commercial Application Examples:

In addition to identification of undercover or otherwise non-uniformed police officers to prevent friendly fire, as described above, the light source transceiver device 100 provides quick identification to police and other paramilitary organizations in search and rescue missions of missing persons, including children. A light source transceiver device 100 can be embedded in a child's personal article such as a backpack, a bicycles, a stuffed animals, shoes or other garment (coat, hat, gloves), a lunch box, or other garment of object that is often with a child when they are abducted, kidnapped, or otherwise missing. If a search and rescue mission results in a night search in a wooded area, the light source transceiver device 100 can be activated to illuminate the child's personal articles and identify the articles' global positioning coordinates. The light source transceiver device 100 may also float in water for the purpose of illuminating the surrounding water environment during a naval search and rescue mission. In yet another embodiment, the light source transceiver 100 may be embedded in a pet leash so as to provide tracking and identification of lost pets.

The transceiver lighting identification system 101 also provides quick identification of personal objects at night. The light source transceiver device 100 may be remotely activated through a mobile phone application to illuminate a person's car in a dark parking lot or a front door of a home so as to enhance personal safety. The light source transceiver device 100 can also be installed on housings of commercial vehicles and aircraft, as well as on floatation devices or other safety equipment that is located in such vehicles or aircraft. In an embodiment, such light source transceiver devices are automatically activated upon receipt of a distress signal indicative of a crash or other emergency situation, such as via networked vehicle security system or the like.

Figure 2:
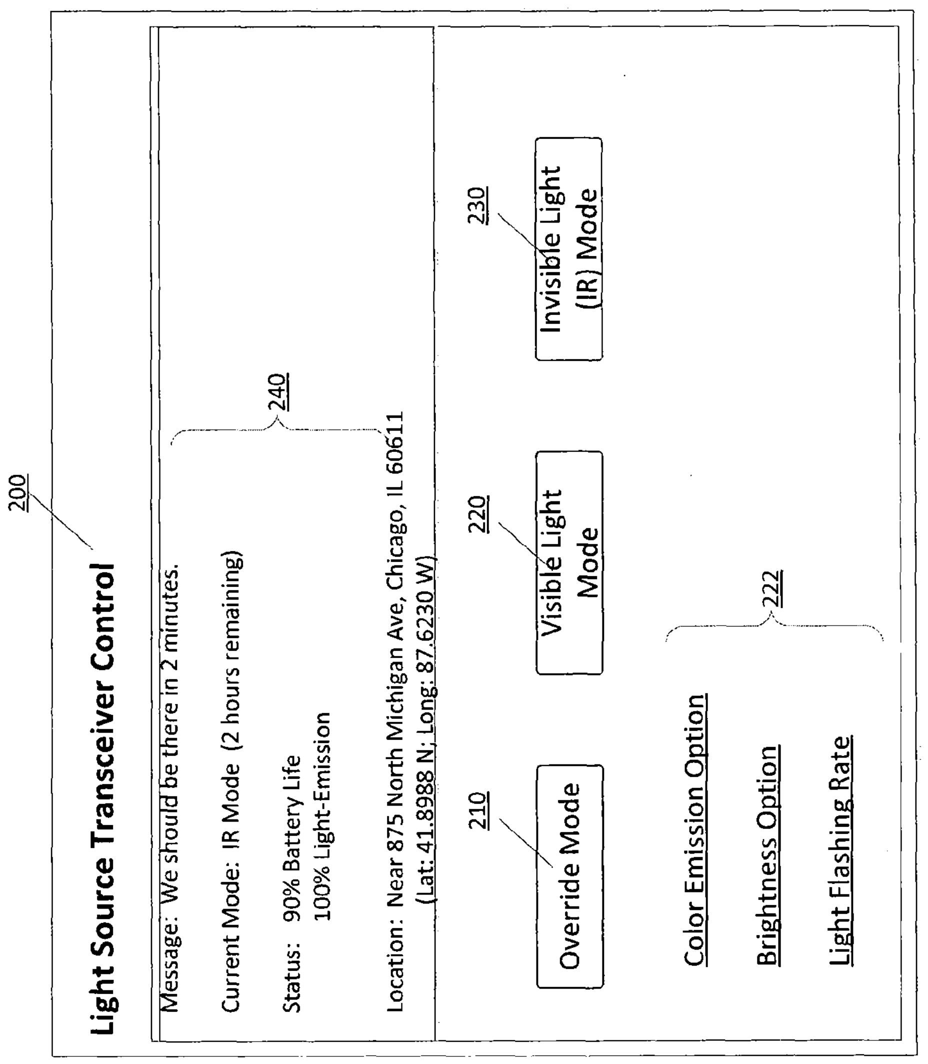
FIG. 2 illustrates a user interface for controlling a light source transceiver device of FIG. 1, in accordance with an embodiment of the present invention.

FIG. 2 illustrates a user interface for controlling a light source transceiver device 100, according to an exemplary embodiment. As described above, the light source transceiver device 100 may include a multi-mode light source 104. In various embodiments, the user interface 200 may be a part of the light source transceiver device 100, the mobile device 126, and/or the command and control center 124. In yet another embodiment, when the user interface 200 is part of the command and control center 124, the override mode option 210 may be unavailable or disabled so as to preserve the ability to override remote activation/deactivation requests in the field, depending upon system configuration in view of the local environment and system application considerations. In one exemplary embodiment, user interface 200 may include a number of selectable options, such as the override mode option 210, a visible light mode option 220, and an invisible light (e.g., IR) mode option 230. An override option 210 enables a user to take complete control of the light source transceiver device 100 while overriding other external control requests. Visible light mode option 220 may include a menu of options 222. This menu of options may include an option to set the light emission color, brightness, or light flashing rate of the light source 104. With regard to the color emission option, for example, user interface 200 provides the user with an ability to select a light-emission color of light source 104. In this regard, a user may select a red light-emitting option, a white light-emitting option, or any other selectable light-emitting color option, including a combination of color emitting options. As described above in connection with FIG. 1, an invisible light mode option 230 may be activated to provide a semi-covert identification functionality that requires special equipment, such as infra-red or night vision equipment, to detect the emitted light. In an embodiment, the invisible light mode option 230 may include a menu of options providing further selection of infra-red light frequency, brightness, flashing rate, and flashing pattern. In an embodiment the visible and or invisible mode options further include a sub-menu allowing emission of a predetermined flashing pattern, including a predetermined Morse code pattern, such as an SOS pattern, or the like.

User interface 200 may further include section 240 that includes other relevant data, such as a status of the light source transceiver device 100 and/or its location. Section 240 may further indicate the current mode of the light source 104 and include any messages that are being communicated among the light source transceiver device 100, the command and control center 124 and the mobile device 126. The interface 200 may further include notifications, including a control request indicator discussed above in connection with FIG. 1. In an embodiment, the interface 200 further includes an authorization section.

Figure 3A:
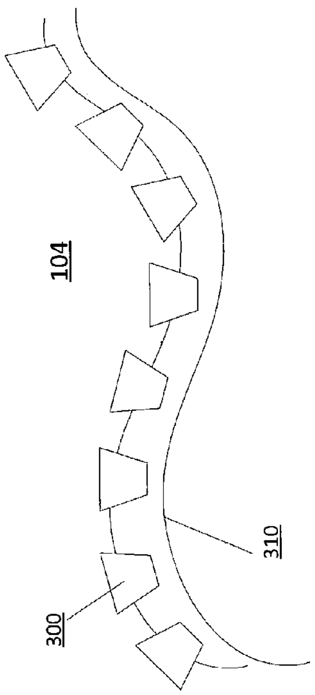
FIGS. 3A and 3B respectively illustrate an example of the light source of FIG. 1, and an exemplary embodiment of integration thereof into a garment, in accordance with embodiments of the present invention.
Figure 3B:
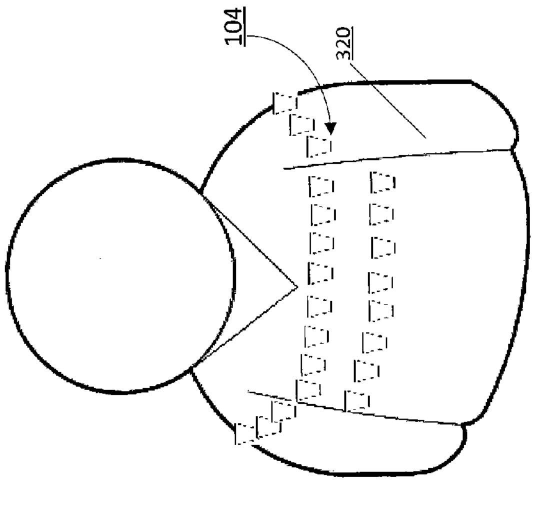

FIGS. 3A and 3B illustrate an exemplary embodiment of the light source 104, and an exemplary integration thereof into a garment. More specifically, FIG. 3A illustrates a light source 104 in which a plurality of light emitting elements 300 are integrated on a flexible material 310. FIG. 2B illustrates an exemplary integration of the light source 104 into a garment 320. This allows the individual wearing garment 320 to be identified and located via light source transceiver device 100, which in this example is external to the light source 104. Alternatively, the light source 104 may be miniaturized and located within the housing 102 of the light source transceiver 100. Lighting system 120 may use a particular color lighting, a particular lighting pattern, or a flash rate to indicate an identity of a single entity or a plurality of entities belonging to the same group.

Various non-limiting examples include integrating light source transceiver device 100 and/or the light source 104 into a soldier's uniform, a police officer's uniform, a fireman's uniform, search and rescue team member's gear, a lifeguard's attire, a pet's collar, a construction worker's garments, or any other individual's garments that would benefit from being identified and located by a multi-mode lighting system 101 described above.

Figures 4A, 4B:
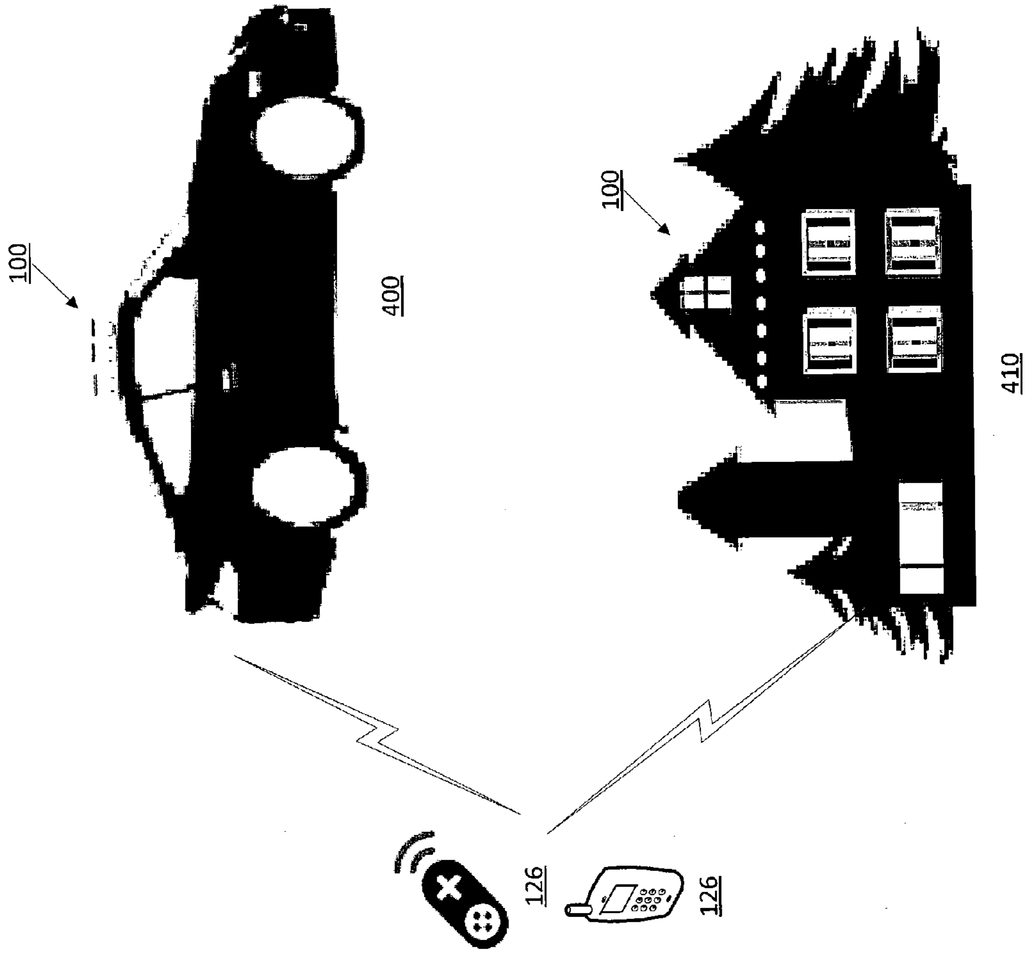
FIGS. 4A and 4B illustrate additional applications of the light source transceiver device of FIG. 1, in accordance with further exemplary embodiments of the present invention.

FIGS. 4A and 4B illustrate other applications of the light source transceiver device 100 according to exemplary embodiments. More specifically, FIG. 4A illustrates a light source transceiver device 100 that is mounted to a vehicle 400. FIG. 4B illustrates a light source transceiver device that is mounted to a residential building 410. The light source transceiver device 100 may be activated by a mobile device 126, the command and control center 124, shown in FIG. 1 (e.g., an alarm monitoring computer server), as well as via local control.

In a further embodiment, the light source transceiver device 100 may be mounted to a boat, as well as on life vests that accompany the boat. In this case, should the boat capsize, the light source transceiver 100 sends an alert to the command and control center 124 and mobile device 126, which causes activation of the lighting source 104 to emit a predetermined color and flash pattern (e.g., an SOS Morse code pattern or a predetermined flash pattern associated with the boat) with respect to the boat and each life-vest user. With such a system, a search and rescue team will be able to identify and associate the individuals wearing the life vests with the boat. In an embodiment, the lighting transceiver 100 automatically activates upon being immersed in water or based upon a gyroscope and/or accelerometer sensor input.

Figure 5:
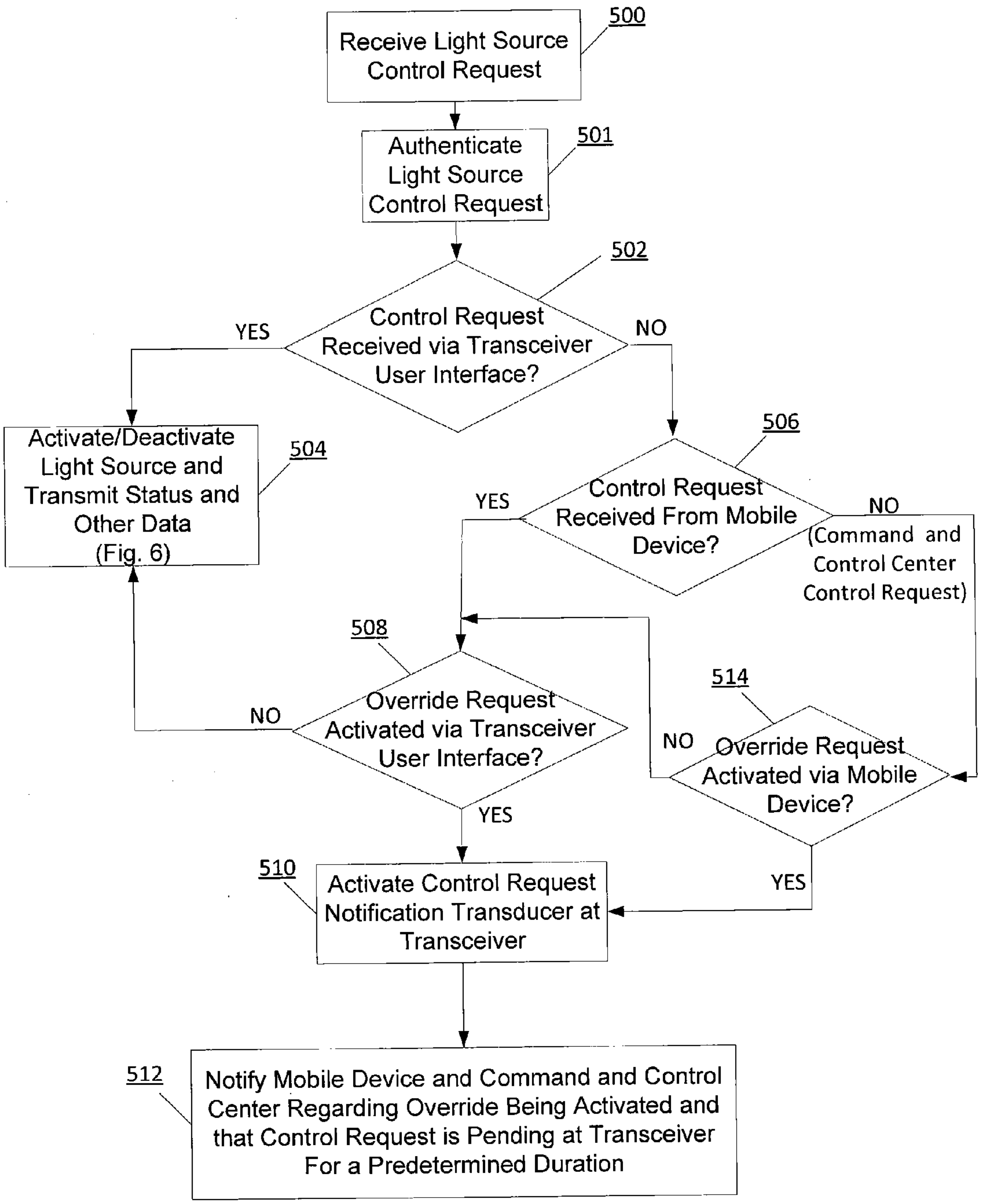
FIG. 5 is a flowchart illustrating a method for providing a light-based identification alert via the light source transceiver device of FIG. 1, in accordance with an embodiment of the present invention.

FIG. 5 illustrates a method for providing a light-based identification alert, in accordance with an embodiment of the invention. In step 500, the processor 108 of the light source transceiver device 100 receives a light source control request and determines whether the source of the control request was user input via the user interface 112, a control request message from the command and control center 124 or the mobile device 126. In step 501, the processor 108 authenticates the light source control request (e.g., via the authentication module 122 described above). In steps 502-504, if the control request originated from a local user directly via the user interface 112, the processor 108 activates or deactivates the light source 104 in accordance with the control request and transmits status and other data to the command and control center 124 and mobile device 126, as further discussed in FIG. 6.

If, on the other hand, the control request was received from the mobile device 126, the processor determines whether an override request or command was locally activated via the user interface 112, steps 506-508. If no override request has been activated through the user interface 112, the processor activates or deactivates the light source 104 and initiates the associated data transmission in step 504. If, however, an override request was activated locally via the user interface 112, the processor 108 activates the control request notification transducer 118 (FIG. 1) to notify the user of the light source transceiver device 100 that a control request has been received while an override command has been activated, step 510.

Next, in step 512, the processor 108 initiates transmission via the communication interface 106 to notify the mobile device 126, as well as command and control center 124, that an override request has been activated and that the control request will be pending at the transceiver device 100 for a predetermined duration (e.g., during a predetermined timer duration). In one embodiment, the control request received when an override request has been activated expires after a predetermined timer duration in the absence of local user input via the user interface 112 to accept the remotely received control request. In another embodiment, upon control request timer expiration, the processor 108 automatically activates or deactivates the light source 104 in the absence of user action. This provides the local user with time to either confirm the override command and prevent control request execution or take no action so as to allow the control request to execute after time expiration. Alternatively or in addition, the user may confirm the control request so as to immediately execute the control request.

Referring again to step 506, if the control request was received from the command and control center 124 (branch "No" in step 506), the processor 108 executes step 514 to determine whether an override request has been activated by the mobile device 126. If the override request has not been activated by the mobile device 126, the processing continues with step 508 to further determine whether an override request has been activated directly by the local user via the user interface 112. The processing then continues to either step 504 (execute control request) or step 510 (activate control request notification transducer), as described above. If, on the other hand, it is determined in step 514 that an override request has been activated by the mobile device 126, the processing continues with step 510 to activate the control request notification transducer 118, as described above.

In one embodiment, an override command activation priority scheme is implemented whereby if an override request has been activated by the local user via the user interface 112, an override request from the mobile device 126 may be denied so as to provide the local user and/or wearer of the light source transceiver device 100 with an increased control over light source activation in view of the higher degree of awareness of the local environment. In a further embodiment, the transceiver device 100 may provide an indication to the user that an override request has been initiated by the mobile device 126, as well as an option to accept such override request and release control of the transceiver 100. Those skilled in the art will realize that, depending upon a particular application, a different priority scheme may be implemented where the override request from the mobile device 126 may instead be given higher priority with respect to the locally generated override request so centralize control of multiple transceivers

100. Further embodiments may include override requests generated via the command and control center 124 with similar override request priority schemes as those described above where the priority increases either with respect to the degree of local situation awareness or with respect to the degree of centralized system control, among other variations.

Figure 6:
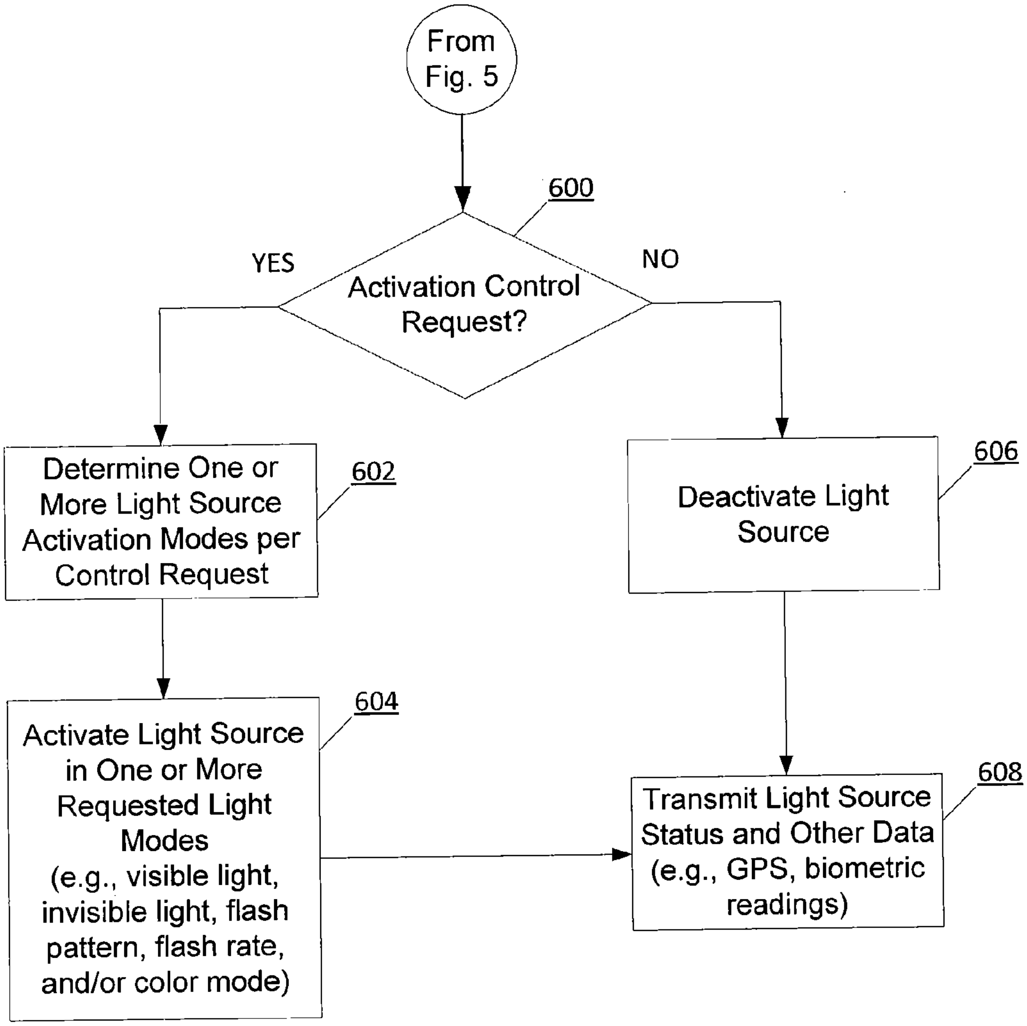
FIG. 6 is a flowchart illustrating further detail with respect to the method of activation or deactivation of the light source transceiver device of FIG. 5, in accordance with an embodiment of the present invention.

Turning to FIG. 6, further detail with respect to the method of activation or deactivation of the light source transceiver device 100 is illustrated, in accordance with an embodiment of the invention. When, in light of the processing in step 504 of FIG. 5, the processor 108 initiates execution of the control request, it determines whether such request is to activate or deactivate the light source 104, step 600. If the control request includes a command to activate the light source 104, the processor 108 determines one or more light source activation modes in accordance with the information included in the control request, step 602.

Next, in step 604, the processor 108 activates the light source 104 in one or more requested light modes, such as visible light, invisible light, a predetermined flash pattern, a predetermined flash rate, and/or a particular color mode, as discussed above. Next, in step 608, the processor 108 initiates transmission of light source status (e.g., on/off, light source mode, battery life) and other data, such as GPS location and/or biometric readings of the user (e.g., heart/pulse rate, blood pressure, temperature, fingerprint scan data, retina scan data, among others). If, however, the control request is to deactivate the light source, the processor 108, in step 606, deactivates the light source 104 and transmits the data discussed above in connection with step 608.

As discussed above, light source transceiver device 100 provides a number of advantageous features. For example, light source transceiver device 100 is configured to provide both remote and local activation of light source 104. In addition, light source transceiver device 100 is configured to operate in a number of modes. For example, in various embodiments, the light source transceiver device 100 includes an override mode, an invisible light (e.g., infra-red light) mode, and a visible light mode so as to provide enhanced control over remote light source activation and enhance user safety.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes and/or be selectively activated or reconfigured by computer executable instructions stored in non-transitory computer memory medium.

It is to be appreciated that the various components of the technology can be located at distant portions of a distributed network and/or the Internet, or within a dedicated secured, unsecured, addressed/encoded and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term "module" as used herein can refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A visual identification device for providing a light based identification alert, the device comprising:

a housing;

a light source, disposed within the housing, for producing the light based identification alert; and a processor configured to control activation of the light source in response to receiving an authorized light source control request from a remote source;

the processor further configured to receive an override command for overriding the authorized light source control request so as to prevent the remote source from controlling the light source and issue a notification that the authorized light source control request is pending at the visual identification device for a predetermined duration.

2. The visual identification device of claim 1 wherein the authorized light source control request comprises a request to activate the light source in accordance with at least one of a plurality of light mode settings, the light mode settings comprising a visible light setting and an invisible light setting.

3. The visual identification device of claim 1 wherein the authorized light source control request is received through a communication interface via a network, the network selected from the group consisting of a satellite network, a cellular network, and a local area network.

4. The visual identification device of claim 3 wherein the communication interface comprises an encryption module for encrypting communications to and from the visual identification device.

5. The visual identification device of claim 1 wherein the authorized light source control request comprises a request to activate at least one visual identification device among a plurality of addressable visual identification devices.

6. The visual identification device of claim 1 further comprising a user input interface for receiving the override command.

7. The visual identification device of claim 1 further comprising a biometric reader configured to provide authentication data for authenticating the override command.

8. The visual identification device of claim 1 further comprising a biometric reader configured to provide authentication data for authenticating a subject of a rescue.

9. The visual identification device of claim 1 further comprising a transducer configured to alert a user that the authorized light source control request has been received.

10. The visual identification device of claim 1 wherein the visual identification device is attached to a garment.

11. The visual identification device of claim 1 wherein the visual identification device is attached to one of a vehicle, a building, and an animal.

12. The visual identification device of claim 1 wherein the authorized light based identification alert comprises a predetermined light pattern emitted by the light source.

13. The visual identification device of claim 1, wherein the visual identification device is configured to transmit an emergency radio beacon indicative of its location.

14. A method for providing a light based identification alert, the method comprising:

receiving an authorized light source control request from a remote source for controlling activation of a light source;

receiving an override command;

overriding the authorized light source control request in response to the override command so as to prevent the remote source from controlling the light source, and issuing a notification that the authorized light source control request is pending at a visual identification device for a predetermined duration.

15. The method of claim 14, wherein receiving the authorized light source control request comprises receiving a request to activate the light source in accordance with at least one of a plurality of light mode settings, the light mode settings comprising a visible light setting and an invisible light setting.

16. The method of claim 14 wherein the authorized light source control request is received through a communication interface via a network, the network selected from the group consisting of a satellite network, a cellular network, and a local area network.

17. The method of claim 16 wherein the communication interface comprises an encryption module for encrypting communications to and from the visual identification device.

18. The method of claim 14 wherein receiving the authorized light source control request comprises receiving a request to activate at least one visual identification device among a plurality of addressable visual identification devices.

19. The method of claim 14 further comprising:

receiving authentication data; and authenticating the override command based on the authentication data.

20. The method of claim 14 further comprising:

receiving authentication data; and authenticating a subject of a rescue based on the authentication data.

21. The method of claim 14 further comprising alerting a user that the authorized light source control request has been received.

22. The method of claim 14, wherein the light based identification alert comprises a predetermined light pattern.

23. The method of claim 14 further comprising transmitting an emergency radio beacon indicative of a geographic location of the light source.

24. A visual identification device for providing a light based identification alert, the device comprising:

a housing;

a multi-mode light source, disposed within the housing, configured to produce the light based identification alert; and a processor configured to (a) control activation of the multi-mode light source in response to receiving an authorized light source control request, (b) receive an override command for overriding the authorized light source control request so as to prevent the remote source from controlling the multi-mode light source, and (c) issue a notification that the authorized light source control request is pending at the visual identification device for a predetermined duration;

wherein the authorized light source control request comprises a request to activate the multi-mode light source in accordance with at least one of a plurality of light mode settings, the light mode settings comprising a visible light setting and an invisible light setting.

25. The visual identification device of claim 24, wherein the authorized light source control request is received from a remote source.

26. The visual identification device of claim 24, wherein the authorized light source control request is received through a communication interface via a network, the network selected from the group consisting of a satellite network, a cellular network, and a local area network.

27. The visual identification device of claim 26, wherein the communication interface comprises an encryption module for encrypting communications to and from the visual identification device.

28. The visual identification device of claim 24, wherein the authorized light source control request comprises a request to activate at least one visual identification device among a plurality of addressable visual identification devices.

29. The visual identification device of claim 24 further comprising a user input interface for receiving the override command.

30. The visual identification device of claim 25 further comprising a biometric reader configured to provide authentication data for authenticating the override command.

31. The visual identification device of claim 24 further comprising a biometric reader configured to provide authentication data for authenticating a subject of a rescue.

32. The visual identification device of claim 24 further comprising a transducer configured to alert a user that the authorized light source control request has been received.

33. The visual identification device of claim 24, wherein the visual identification device is attached to a garment.

34. The visual identification device of claim 24, wherein the visual identification device is attached to one of a vehicle, a building, and an animal.

35. The visual identification device of claim 24, wherein the light based identification alert comprises a predetermined light pattern emitted by the light source.

36. The visual identification device of claim 24, wherein the visual identification device is configured to transmit an emergency radio beacon indicative of its location.

37. A method for providing a light based identification alert, the method comprising:

receiving an authorized light source control request from a remote source, the authorized light source control request comprising a request to activate a multi-mode light source in accordance with at least one of a plurality of light mode settings, the light mode settings comprising a visible light setting and an invisible light setting;

controlling activation of the multi-mode light source in response to receiving the authorized light source control request so as to generate the light based identification alert;

receiving an override command for overriding the authorized light source control request;

preventing the remote source from controlling the multi-mode light source based on the override command; and issuing a notification that the authorized light source control request is pending at a visual identification device for a predetermined duration.

38. The method of claim 37, wherein the authorized light source control request is received through a communication interface via a network, the network selected from the group consisting of a satellite network, a cellular network, and a local area network.

39. The method of claim 38, wherein the communication interface comprises an encryption module for encrypting communications to and from the visual identification device.

40. The method of claim 37, wherein receiving the authorized light source control request comprises receiving a request to activate at least one visual identification device among a plurality of addressable visual identification devices.

41. The method of claim 37 further comprising:

receiving authentication data; and authenticating the override command based on the authentication data.

42. The method of claim 37 further comprising:

receiving authentication data; and authenticating a subject of a rescue based on the authentication data.

43. The method of claim 37 further comprising alerting a user that the authorized light source control request has been received.

44. The method of claim 37, wherein the authorized light based identification alert comprises a predetermined light pattern.

45. The method of claim 37 further comprising transmitting an emergency radio beacon indicative of a geographic location of the multi-mode light source.

* * * * *